United States Patent
Xia

(10) Patent No.: US 10,845,988 B2
(45) Date of Patent: Nov. 24, 2020

(54) HANDWRITING BOARD WITH FIXING MEMBER TO FIX WRITING PAPER

(71) Applicant: SHENZHEN ROYOLE TECHNOLOGIES CO. LTD., Shenzhen (CN)

(72) Inventor: Xinyuan Xia, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/468,767

(22) PCT Filed: Jun. 8, 2017

(86) PCT No.: PCT/CN2017/087558
§ 371 (c)(1),
(2) Date: Jun. 12, 2019

(87) PCT Pub. No.: WO2018/223328
PCT Pub. Date: Dec. 13, 2018

(65) Prior Publication Data
US 2019/0369865 A1   Dec. 5, 2019

(51) Int. Cl.
*G06F 3/0488* (2013.01)
*G06F 3/044* (2006.01)
(Continued)

(52) U.S. Cl.
CPC ........... *G06F 3/04883* (2013.01); *B43L 1/00* (2013.01); *G06F 3/03545* (2013.01); *G06F 3/0442* (2019.05); *G06F 2203/04102* (2013.01)

(58) Field of Classification Search
CPC .... B43L 1/00; B43L 3/00; G06F 2203/04102; G06F 3/03545; G06F 3/03547; G06F 3/0393; G06F 3/0442; G06F 3/04883
See application file for complete search history.

(56) References Cited

U.S. PATENT DOCUMENTS

| | | | |
|---|---|---|---|
| 2011/0036648 A1* | 2/2011 | Chen | G06F 3/03545 178/18.03 |
| 2018/0136746 A1* | 5/2018 | Yokotsuka | G06F 3/046 |
| 2018/0181221 A1* | 6/2018 | Nakajima | G06F 40/171 |

FOREIGN PATENT DOCUMENTS

| | | |
|---|---|---|
| CN | 101994946 A | 3/2011 |
| CN | 203771338 U | 8/2014 |

(Continued)

OTHER PUBLICATIONS

International search report dated Mar. 14, 2018 from corresponding application No. PCT/CN2017/087558.

*Primary Examiner* — Chun-Nan Lin
(74) *Attorney, Agent, or Firm* — Hauptman Ham, LLP

(57) ABSTRACT

A handwriting board is provided. The handwriting board includes a bendable support plate, a touch screen and a control module located at the bendable support plate. The touch screen and the control module are electrically connected with each other. The touch screen is configured to sense a writing operation of a stylus on a writing paper and to generate touch coordinate data of the writing operation. The control module is configured to acquire the touch coordinate data and to generate touch handwriting information according to the touch coordinate data. The handwriting board is configured to sense the writing operation of the stylus on the writing paper and to form the touch handwriting information corresponding to an actual handwriting of the stylus formed on the writing paper.

18 Claims, 5 Drawing Sheets

(51) Int. Cl.
*B43L 1/00* (2006.01)
*G06F 3/0354* (2013.01)

(56) References Cited

FOREIGN PATENT DOCUMENTS

| | | |
|---|---|---|
| CN | 105927894 A | 9/2016 |
| CN | 106051512 A | 10/2016 |
| JP | 2015210988 A | 11/2015 |

* cited by examiner

HANDWRITING BOARD WITH FIXING MEMBER TO FIX WRITING PAPER

RELATED APPLICATION

The present application is a National Phase of International Application Number PCT/CN2017/087558, filed Jun. 8, 2017.

TECHNICAL FIELD

The present disclosure relates to the field of touch control technology, and particularly to a handwriting board.

BACKGROUND

A handwriting board is configured to implement text or image input by sensing writing operations of a stylus or a finger(s). The handwriting board provides users with a relative rich input experience than a keyboard. However, a traditional handwriting board is usually configured to recognize characters input by the users by sensing touch operations, and to obtain standard characters corresponding to the characters input for display and storage, resulting in that original shapes of the characters input by the users cannot be represented. At the same time, since the surface of the traditional handwriting board is generally smooth, it is incapable of providing the users with a paper-like writing experience. In addition, the traditional handwriting board is mostly formed with a single piece of a rigid material, thereby failing to provide writing experience on a small area and convenient portability.

SUMMARY

In view of the above-mentioned problems in the art, embodiments of the present disclosure provide a handwriting board to realize digital storage of handwriting input content and improve the portability while ensuring a paper-like writing experience.

A handwriting board is provided. The handwriting board includes a bendable support plate operable to support a writing paper thereon, a touch screen and a control module located at the bendable support plate. The touch screen and the control module are electrically connected with each other. The touch screen is configured to sense a writing operation of a stylus on the writing paper and to generate touch coordinate data of the writing operation. The control module is configured to acquire the touch coordinate data and to generate touch handwriting information according to the touch coordinate data.

The handwriting board arranges the touch screen and the control module on the bendable support plate, such that the stylus is capable of writing on the writing paper covering the bendable support plate to form an actual handwriting. At the same time, the touch screen senses the writing operation of the stylus and generates the touch coordinate data of the writing operation, and then the control module generates the touch handwriting information corresponding to the actual handwriting according to the touch coordinate data. The handwriting board can provide a realistic paper-like writing experience and support digital storage of handwriting input. Moreover, since the bendable support plate is bendable, the bendable support plate can be folded to achieve small-area writing experience when necessary and increase the portability of the handwriting board.

BRIEF DESCRIPTION OF THE DRAWINGS

To describe the technical solutions in the embodiments of the present disclosure more clearly, the following briefly introduces the accompanying drawings required for describing the embodiments.

DETAILED DESCRIPTION OF ILLUSTRATED EMBODIMENTS

Technical solutions in embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

Figure 1:
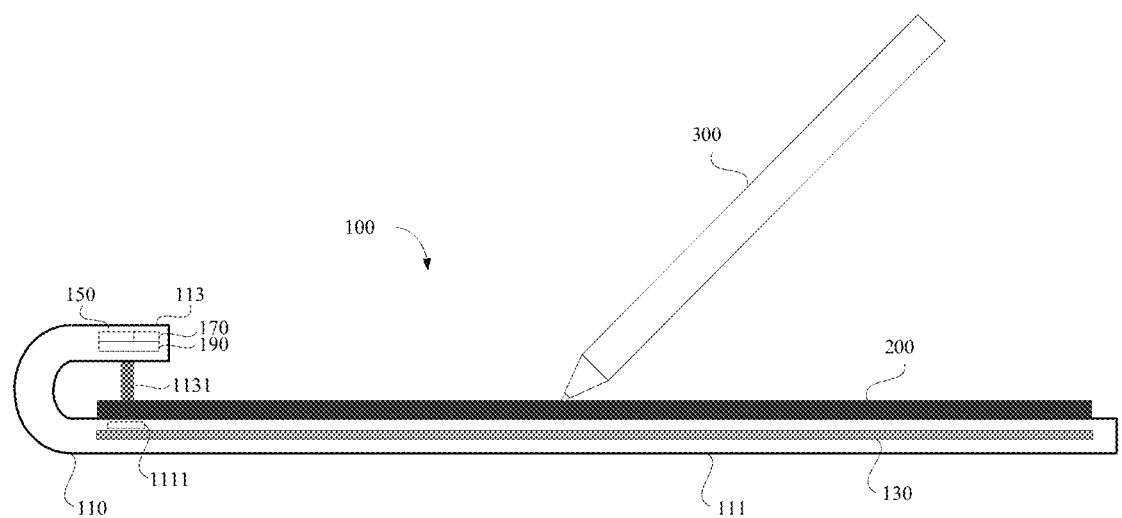
FIG. 1 is a first schematic structural view of a handwriting board according to an embodiment of the present disclosure.

Referring to FIG. 1, a handwriting board 100 is provided according to one embodiment of the present disclosure. The handwriting board 100 includes a bendable support plate 110, a touch screen 130 and a control module 150 electrically coupled with the touch screen 130 and mounted on the bendable support plate 110. The bendable support plate 110 is operable to support a writing paper 200 thereon. The touch screen 130 is configured to sense a writing operation of a stylus 300 on the writing paper 200 and to generate touch coordinate data of the writing operation. The control module 150 is configured to acquire the touch coordinate data and to generate touch handwriting information according to the touch coordinate data. In this embodiment, when the stylus 300 writes on the writing paper 200, the stylus 300 drives the handwriting board 100 to form the touch handwriting information corresponding to an actual handwriting while forming the actual handwriting on the writing paper 200. It can be understood that the touch screen 130 can be a flexible touch screen or a rigid touch screen.

In one embodiment, the handwriting board 100 may further include a communication module 170. The communication module 170 is electrically connected with the control module 150 and configured to establish a communication connection between the handwriting board 100 and an electronic device (such as, a smart phone, a tablet, etc.), and to transmit the touch handwriting information to the electronic device, thereby facilitating the electronic device to store the touch handwriting information, or to synchronously display a corresponding touch handwriting. It can be understood that, as one embodiment, the communication module 170 can also be integrated into the control module 150. For example, the control module 150 may include a processor with Bluetooth communication functions such that the touch handwriting information can be generated by the processor according to the touch coordinate data and transmitted to the electronic device via Bluetooth communication.

The stylus 300 may include a refill capable of writing to form the actual handwriting on the writing paper 200, and has touch pressure sensing function and wireless communication function. When the stylus 300 writes on the writing paper 200, the stylus 300 generates pressure data by sensing touch pressure and transmits the pressure data to the handwriting board 100 by wireless communication, and then the handwriting board 100 generates the touch handwriting information corresponding to the actual handwriting by combining the touch coordinate data and the pressure data. It will be appreciated that the refill of the stylus 300 may be a refill that stores a fluid material that can be written to form actual writing, such as an ink refill. Alternatively, the refill of the stylus 300 may be an integrally molded refill formed by a solid material that can be written to form actual writing, such as a pencil lead.

In this embodiment, the touch screen 130 may be a flexible capacitive touch screen. The touch screen 130 is configured to sense touch signals of the stylus 300 and to form a coupling capacitance with the stylus 300, thereby generating the touch coordinate data according to the change of the coupling capacitance. It can be understood that in order to prevent accidental touch operations caused by non-stylus touch signals such as finger touch and palm touch, the touch screen 130 can be configured to block non-stylus touch signals other than the touch signals of the stylus 300, thereby improving the accuracy of the detection of stylus touch signals and optimizing the touch writing experience. It can be understood that the touch screen 130 can also be a flexible resistive touch screen.

Figure 2:
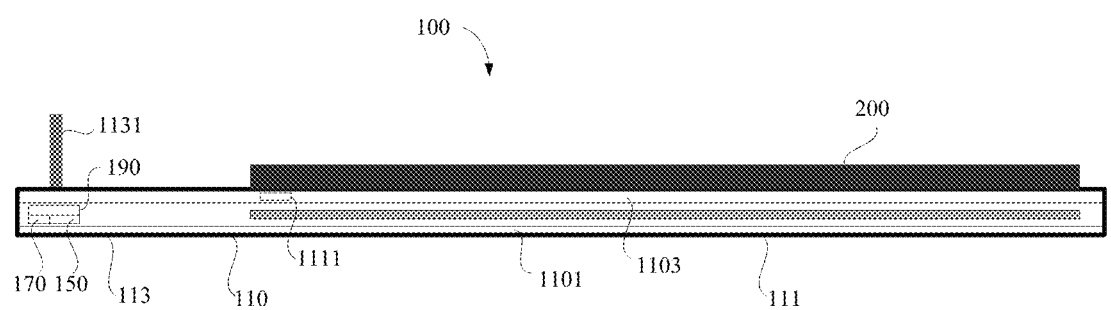
FIG. 2 is a second schematic structural view of a handwriting board according to an embodiment of the present disclosure.

Referring to FIG. 2, as one embodiment, the bendable support plate 110 includes a bottom plate 1101 and a cover plate 1103. The touch screen 130 is located between the bottom plate 1101 and the cover plate 1103. The cover plate 1103 is operable to support the writing paper 200 thereon. It can be understood that when the writing paper 200 is placed on the cover plate 1103 and the stylus 300 is writing on the writing paper 200, the effect of sensing the touch signals will not be influenced by the cover plate 1103. That is, the touch screen 130 is capable of sensing the touch signals of the stylus 300 with the writing paper 200 and the cover plate 1103 interposed therebetween. It can be understood that, as one embodiment, the touch screen 130 can also be directly located on an upper surface of the bendable support plate 110, and the writing paper 200 can directly be placed on the touch screen 130.

Referring to FIGS. 1 to 2, in one embodiment, the bendable support plate 110 may have a writing region 111 and a fixing region 113, and the touch screen 130 is located at the writing region 111. The fixing region 113 is connected with the writing region 111 and is operable to be bended relative to the writing region 111, such that the writing paper 200 is detachably fixed to the writing region 111 by the fixing region bended.

As one embodiment, the handwriting board 100 further includes a first fixing member 1131 and a second fixing member 1111. The first fixing member 1131 is located at the fixing region 113, and the second fixing member 1111 is located at the writing region 111. When the fixing region 113 is bended with respect to the writing region 111, the first fixing member 1131 is fixed with the second fixing member 1111 to clamp and fix the writing paper 200 therebetween. When the fixing region 113 is unfolded with respect to the writing region 111, the first fixing member 1131 is separated from the second fixing member 1111, thereby facilitating removal of the writing paper 200 when finishing writing, and replacement of the writing paper 200 with a new blank writing paper. The second fixing member 1111 is located below the writing paper 200. When the first fixing member 1131 is fixed with the second fixing member 1111, the writing paper 200 is pressed and fixed by the first fixing member 1131.

As one embodiment, the first fixing member 1131 includes a magnetic fixing post located at an end of the fixing region 113 away from the writing region 111. The second fixing member 1111 includes a magnet located within the writing region 111 and corresponds to the magnetic fixing post in position. That is, when the fixing region 113 is bended relative to the writing region 111, the magnetic fixing post is facing the magnet. When the fixing region 113 is bended, the magnetic fixing post is magnetically attracted by the magnet to clamp and fix the writing paper 200 therebetween.

Figure 3:
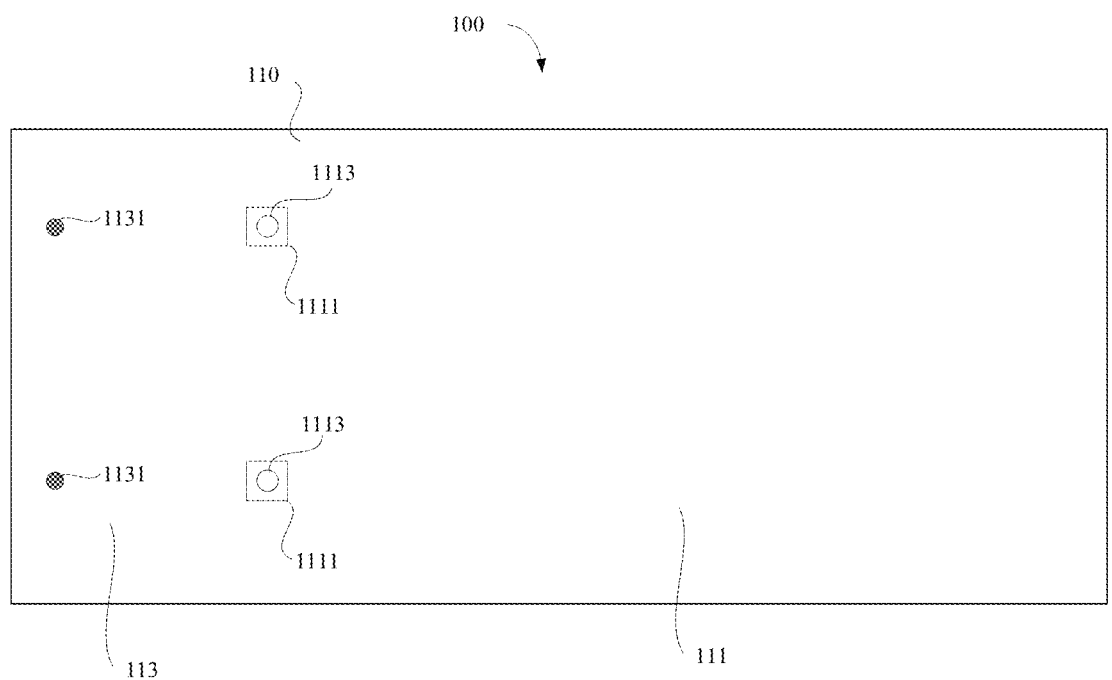
FIG. 3 is a third schematic structural view of a handwriting board according to an embodiment of the present disclosure.

Referring to FIG. 3, as one embodiment, an upper surface of the writing region 111 corresponding to the magnet defines a positioning hole 1113. When the fixing region 113 is bended, the magnetic fixing post is inserted into the positioning hole 1113. It can be understood that the positioning groove 1113 may be a groove defined on an upper surface of the cover plate 1103, and the magnet may be embedded in the cover plate 1103 and located at a bottom end of the positioning groove 1113.

As one embodiment, two magnetic fixing posts spaced apart with each other may be laterally located on an upper surface of the end of the fixing region 113 away from the writing region 111. Two magnets spaced apart with each other are located at the writing region 111 and corresponding to the two magnetic fixing posts, such that the two magnetic fixing posts are magnetically attracted by the two magnets when the fixing region 113 is bended, thereby clamping and fixing the writing paper 200. Correspondingly, in order to achieve a more stable attachment, two positioning grooves 1113 spaced apart with each other can be defined corresponding to the two magnets. In this way, when the two magnetic fixing posts are attracted by the two magnets, a portion where the writing paper 200 is in contact with the two magnetic fixing posts is embedded in the two positioning grooves 1113 together with the two magnetic fixing posts, so as to prevent the writing paper 200 from falling off from the handwriting board 100 during writing.

It can be understood that, as one embodiment, the first fixing member 1131 may include a magnetic fixing post and the second fixing member 1111 may have a fixing hole, and the fixing hole is located below the writing paper 200. When the fixing region 113 is bended with respect to the writing region 111, the magnetic fixing post can be inserted into the fixing hole to fix the writing paper 200.

Referring to FIG. 2, as one embodiment, the handwriting board 100 further includes a battery 190. The battery 190, the control module 150, and the communication module 170 are located between the bottom plate 1101 and the cover plate 1103 of the bendable support plate 110. The battery 190 is electrically connected with the control module 150 and the communication module 170 for powering the control module 150 and the communication module 170. The battery 190 can also be electrically connected with the touch screen 130 via a flexible circuit board for powering the touch screen 130.

As one embodiment, the control module 150, the communication module 170, and the battery 190 are located at the fixing region 113, and located at the end of the fixing region 113 away from the writing region 111. As the control module 150, the communication module 170, and the battery 190 are thick as a whole, such that a relative large space will be occupied and heat will be generated during operation. Thus, the control module 150, the communication module 170, and the battery 190 are located at the end of the fixing region 113 away from the writing region 111, so as to ensure the flatness of the writing region 111 and prevent the tactile provided by the writing region 111 from being influenced by the heat generated during operation. It can be understood that the control module 150, the communication module 170, and the battery 190 can also be located at an end of the bendable support plate 110 relative to the fixing region 113, that is, an end of the bendable support plate 110 away from the fixing region 113 and outside the writing region 111.

Figure 4:
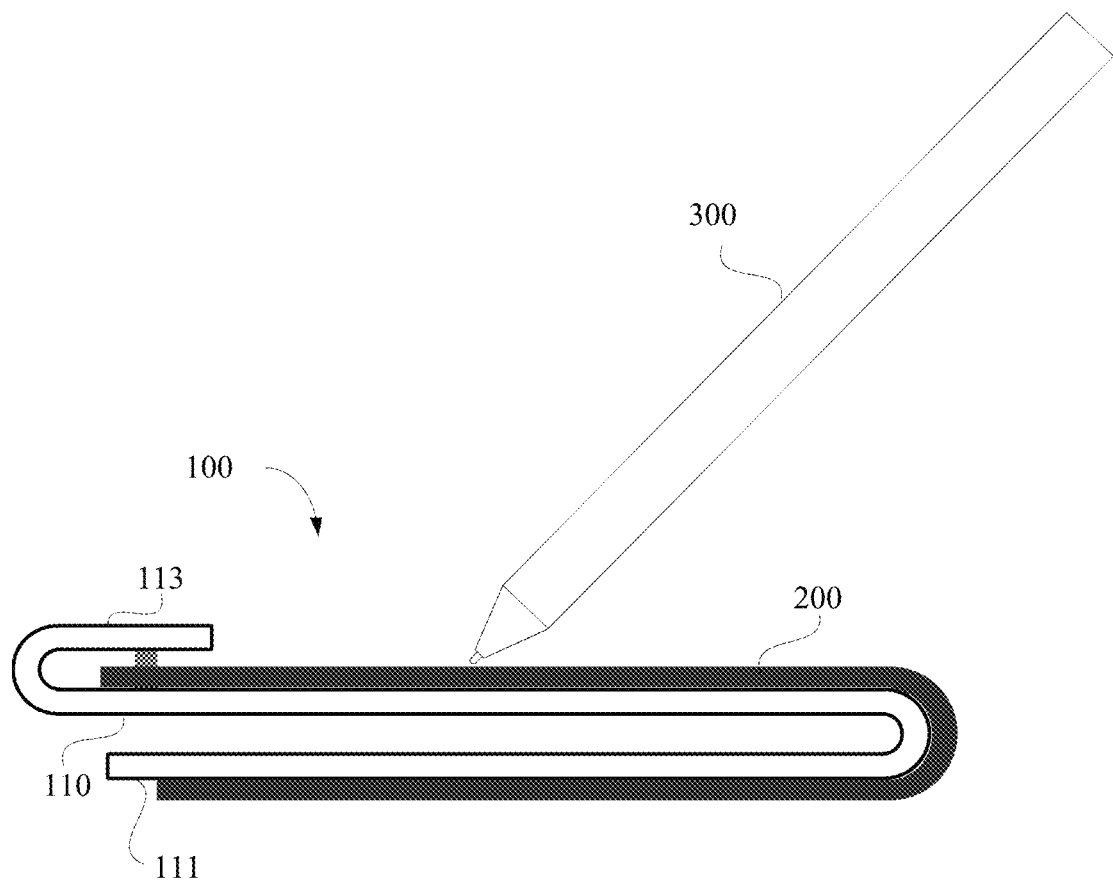
FIG. 4 is a fourth schematic structural view of a handwriting board according to an embodiment of the present disclosure.

Referring to FIG. 4, as one embodiment, the bendable support plate 110 is made of a flexible material. Since the entire bendable support plate 110 is made of the flexible material, the handwriting board 100 can be freely folded to achieve writing experience in a small-area region when necessary, and the portability of the handwriting board 100 can be increased. In this embodiment, the touch screen 130 is a flexible touch screen.

Figure 5:
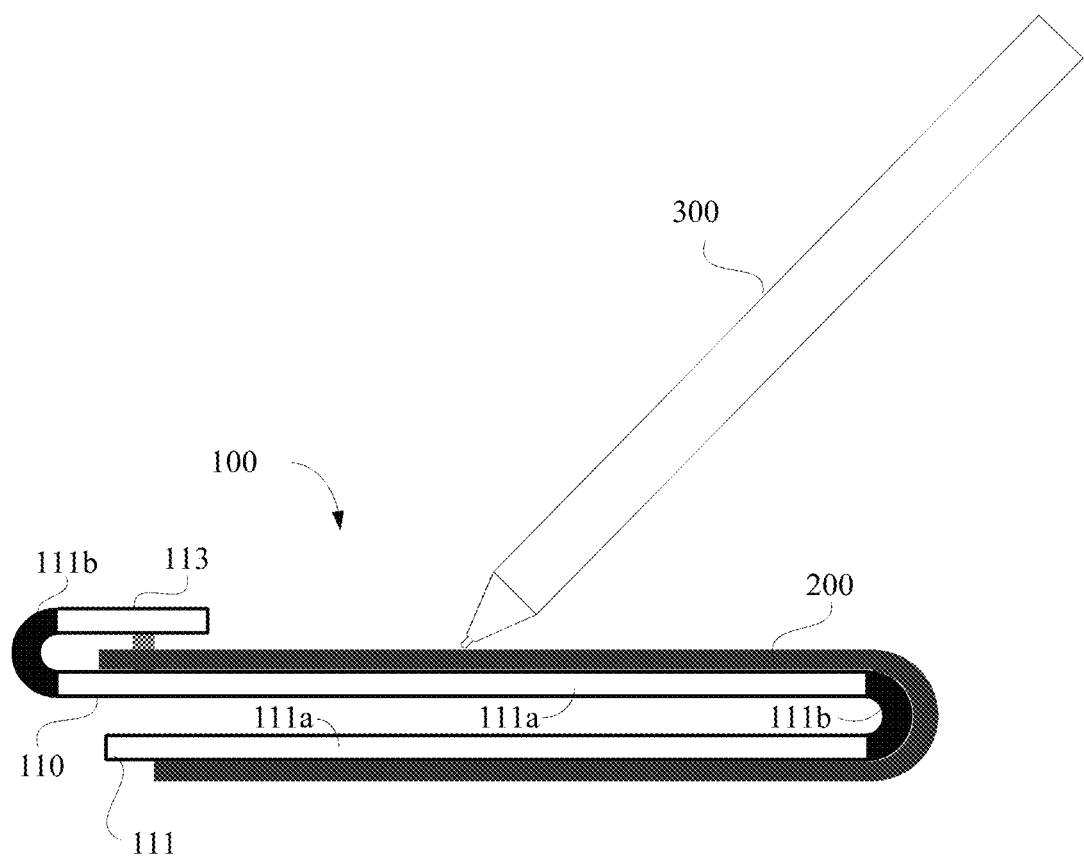
FIG. 5 is a fifth schematic structural view of a handwriting board according to an embodiment of the present disclosure.

Referring to FIG. 5, as one embodiment, the bendable support plate 110 is made of both a rigid material and a flexible material connected with each other. For example, the writing region 111 may include multiple rigid regions 111a made of the rigid material, and the multiple rigid regions 111a are connected by multiple connection regions 111b made of the flexible material. Meanwhile, the fixing region 113 is made of the rigid material, and is connected to the writing region 111 via another connection region 111b made of the flexible material to ensure that the fixing region 113 can be bended or unfolded with respect to the writing region 111. In this embodiment, the above-described connection manner is applied to the bendable support plate 110, such that the multiple rigid regions 111a can be folded or unfolded with each other to facilitate adjustment of a writing area of the writing region 111. Meanwhile, since that when the bendable support plate 110 is in a folded state, a small-area writing region obtained by folding and stacking the multiple rigid regions 111a with each other is still in a rigid state, thereby improving the writing experience while writing on the small-area writing region. In this embodiment, the touch screen 130 is a flexible touch screen.

The touch screen 130 and the control module 150 are mounted on the bendable support plate 110, such that the stylus 300 may be used to write on the writing paper 200 covering the bendable support plate 110 to form the actual handwriting. At the same time, the touch screen 130 senses the writing operation of the stylus 300 and generates the touch coordinate data of the writing operation, and then the control module 150 generates the touch handwriting information corresponding to the actual handwriting according to the touch coordinate data. The handwriting board 100 can provide a realistic paper-like writing experience and realize digital storage of handwriting input. Moreover, since the bendable support plate 110 is bendable, the bendable support plate 110 can be folded to achieve small-area writing experience when necessary and increases the portability of the handwriting board 100.

Those described above are merely preferred embodiments of the present disclosure but not as limiting the scope of the present disclosure. Those skilled in the art can understand that all or part of the processes for implementing the above embodiments, and equivalent changes made according to the claims of the present disclosure still fall within the scope of the present disclosure.

What is claimed is:

1. A handwriting board, comprising:
   a bendable support plate operable to support a writing paper thereon;
   a touch screen and a control module located at the bendable support plate, the touch screen and the control module being electrically connected with each other;
   wherein the touch screen is configured to sense a writing operation of a stylus on the writing paper and to generate touch coordinate data of the writing operation; and
   the control module is configured to acquire the touch coordinate data and to generate touch handwriting information according to the touch coordinate data wherein
   the bendable support plate comprises a writing region and a fixing region;
   the touch screen is located at the writing region;
   the fixing region is connected with the writing region and is operable to be bended relative to the writing region, such that the writing paper is detachably fixed to the writing region by the fixing region in a bent state;
   the handwriting board comprises a first fixing member located at the fixing region and a second fixing member located at the writing region;
   the fixing region is operable to be bended relative to the writing region such that the first fixing member is fixed to the second fixing member;
   the fixing region is operable to be unfolded relative to the writing region such that the first fixing member is separated from the second fixing member; and
   when the first fixing member is fixed to the second fixing member, the writing paper is clamped and fixed between the first fixing member and the second fixing member.

2. The handwriting board of claim 1, wherein the second fixing member is located below the writing paper, and the writing paper is pressed and fixed by the first fixing member when the first fixing member is fixed with the second fixing member.

3. The handwriting board of claim 1, wherein:
   the first fixing member comprises a magnetic fixing post, and the second fixing member comprises a magnet located within the writing region; and
   when the fixing region is bended, the magnetic fixing post is magnetically attracted by the magnet to clamp and fix the writing paper therebetween.

4. The handwriting board of claim 3, wherein:
   an upper surface of the writing region corresponding to the magnet defines a positioning hole; and
   the magnetic fixing post is inserted into the positioning hole when the fixing region is bended.

5. The handwriting board of claim 1, wherein the bendable support plate comprises a bottom plate and a cover plate, the touch screen is located between the bottom plate and the cover plate, and the cover plate is operable to support the writing paper thereon.

6. The handwriting board of claim 5, wherein:
   the handwriting board further comprises a battery; and
   the battery and the control module are located between the bottom plate and the cover plate of the bendable support plate, and are electrically connected with the touch screen via a flexible circuit board.

7. The handwriting board of claim 5, further comprising:
a communication module, located between the bottom plate and the cover plate of the bendable support plate and electrically connected with the control module, the communication module being configured to establish a communication connection between the handwriting board and an electronic device, and to transmit the touch handwriting information to the electronic device.

8. The handwriting board of claim 1, wherein the control module is located within the fixing region.

9. The handwriting board of claim 1, wherein the control module is located at an end of the bendable support plate away from the fixing region.

10. The handwriting board of claim 1, wherein:
the touch screen is a capacitive touch screen, and the stylus is a capacitive stylus; and
the handwriting board is driven to generate the touch handwriting information corresponding to actual handwriting when the actual handwriting is formed on the writing paper through writing with the stylus.

11. The handwriting board of claim 1, wherein the bendable support plate is made of a flexible material.

12. The handwriting board of claim 1, wherein the bendable support plate is made of both a rigid material and a flexible material connected with each other.

13. The handwriting board of claim 12, wherein the writing region comprises a plurality of rigid regions made of the rigid material and a plurality of connection regions made of the flexible material, and the plurality of rigid regions are connected via the plurality of connection regions.

14. The handwriting board of claim 13, wherein the fixing region is made of the rigid material and is connected with the writing region via another connection region made of the flexible material.

15. The handwriting board of claim 13, wherein a writing area of the writing region is operable to be adjusted by folding or unfolding the plurality of rigid regions.

16. The handwriting board of claim 1, wherein the touch screen is a flexible touch screen.

17. A handwriting board, comprising:
a bendable support plate operable to support a writing paper thereon;
a touch screen and a control module located at the bendable support plate, the touch screen and the control module being electrically connected with each other;
wherein the touch screen is configured to sense a writing operation of a stylus on the writing paper and to generate touch coordinate data of the writing operation; and
the control module is configured to acquire the touch coordinate data and to generate touch handwriting information according to the touch coordinate data;
wherein
the bendable support plate comprises a writing region and a fixing region;
the touch screen is located at the writing region;
the fixing region is connected with the writing region and is operable to be bended relative to the writing region, such that the writing paper is detachably fixed to the writing region by the fixing region in a bent state;
the handwriting board comprises a first fixing member located at the fixing region and a second fixing member located at the writing region;
the fixing region is operable to be bended relative to the writing region such that the first fixing member is fixed to the second fixing member;
the fixing region is operable to be unfolded relative to the writing region such that the first fixing member is separated from the second fixing member;
the first fixing member comprises a magnetic fixing post, and the second fixing member comprises a magnet located within the writing region; and
when the fixing region is bended, the magnetic fixing post is magnetically attracted by the magnet to clamp and fix the writing paper therebetween.

18. The handwriting board of claim 17, wherein:
an upper surface of the writing region corresponding to the magnet defines a positioning hole; and
the magnetic fixing post is inserted into the positioning hole when the fixing region is bended.

* * * * *